(12) United States Patent
Farley et al.

(10) Patent No.: US 6,559,991 B1
(45) Date of Patent: *May 6, 2003

(54) POLARIZATION MODE DISPERSION COMPENSATION

(75) Inventors: Kevin Stuart Farley, Bishop's Stortford (GB); Richard Edward Epworth, Sawbridgeworth (GB); Daniel Watley, Cambs (GB)

(73) Assignee: Nortel Networks Limited, St. Laurent (CA)

( * ) Notice: Subject to any disclaimer, the term of this patent is extended or adjusted under 35 U.S.C. 154(b) by 0 days.

This patent is subject to a terminal disclaimer.

(21) Appl. No.: 09/231,436

(22) Filed: Jan. 14, 1999

(30) Foreign Application Priority Data

Aug. 28, 1998 (GB) .............................. 9818941

(51) Int. Cl.⁷ .............................. H04B 10/00
(52) U.S. Cl. ................... 359/156; 359/161; 359/192; 359/158; 359/189; 359/122; 359/110; 359/181
(58) Field of Search ............... 359/156, 192, 359/122, 158, 189, 110, 181, 161

(56) References Cited

U.S. PATENT DOCUMENTS

| 4,801,189 A | * | 1/1989 | Shaw et al. | 350/96.15 |
| 5,345,331 A | * | 9/1994 | Bergano et al. | 359/341 |
| 5,473,457 A | * | 12/1995 | Ono | 359/161 |
| 5,491,576 A | * | 2/1996 | Bergano | 359/156 |
| 5,526,162 A | * | 6/1996 | Bergano | 359/181 |
| 5,659,412 A | * | 8/1997 | Hakki | 359/156 |
| 5,912,755 A | * | 6/1999 | Bergano | 359/181 |
| 5,946,119 A | * | 8/1999 | Bergano et al. | 359/124 |
| 5,949,560 A | * | 9/1999 | Roberts et al. | 359/110 |
| 6,057,950 A | * | 5/2000 | Bergano | 359/181 |

* cited by examiner

Primary Examiner—Leslie Pascal
Assistant Examiner—David C. Payne
(74) Attorney, Agent, or Firm—Barnes & Thornburg

(57) ABSTRACT

A method of compensating the polarisation mode dispersion (PMD) of an optical transmission path carrying clocked digital data traffic involves modulating the state of polarisation (SOP) of the light launched into the transmission path, and employing consequential frequency components in an electrical signal detected at the far end of the transmission path to regulate the birefringence of a polarisation state controller portion of a birefringent element inserted between the transmission path and the receiver's photodetector. The SOP modulation, when represented on a Poincaré sphere, has an oscillatory rotational component at a frequency $f_1$ about a first axis of the sphere and an oscillatory rotational component at a frequency $f_2$ about a second axis of the sphere that is orthogonal to said first axis, and where $f_1 \neq f_2$, $f_1 \neq 2f_2$, and $f_2 \neq 2f_1$.

16 Claims, 9 Drawing Sheets

POLARIZATION MODE DISPERSION COMPENSATION

BACKGROUND OF THE INVENTION

When nominally circularly symmetric optical fibre is employed as a long distance transmission path from an optical transmitter to an optical receiver, the departures from perfect circular symmetry of that fibre can be of a sufficient magnitude for the fibre to function as a concatenation of birefringent elements of random relative orientation. Moreover that orientation is liable to change with time.

When polarised light of any particular wavelength is transmitted through a single element exhibiting uniform birefringence, that light is, in general, resolved into two components (modes) propagating with two specific different velocities, and so possessing different transit times of propagation through that element. For each of two particular orthogonal states of polarisation (SOPs), known as the principal SOPs, the light is not resolved into different components, but propagates at a single velocity with a single transit time, i.e. propagates as a single (polarisation) mode. These principal SOPs are aligned with the principal axes of birefringence of the element. For light launched into the element with either one of these two principal SOPs, the SOP of the light remains unchanged in its passage through the element. For light launched into the element with any other SOP, that light is resolved in its passage through the element into two orthogonal components aligned with the principal axes of the element and propagating with different velocities. As the result in the velocity difference, the relative phase of the two components at the far end of the element is generally not the same as that at the launch (input) end, and so the light emerging at the far end generally emerges with an SOP that is different from that with which it entered the element. This characteristic can be conceptualised as the SOP of the light evolving in a cyclic manner in its passage through the element.

When polarised light is transmitted through a concatenation of elements, each exhibiting uniform birefringence, but whose principal axes are not all co-aligned, then, even if that light is not resolved into two components by the first element of the concatenation, it will be so resolved by a later element. Then each of those two elements will itself be resolved into two further components by an element further along the concatenation, and so on. It can be demonstrated that for any such concatenation there exists a specific pair of orthogonal SOPs having the property that light launched with either SOP into the concatenation propagates through it with a single transit time. The transit is faster for one of the SOPs than for the other, and the difference in transit time, the differential group delay (DGD), is a measure of the first order polarisation mode dispersion (PMD) of the concatenation. (The term first order PMD is employed in this specification to denote the DGD in respect of a particular wavelength, thereby excluding from its ambit consideration of second order PMD effects which describe the wavelength dependence of that DGD.) For neither one of this specific pair of orthogonal SOPs is the launch SOP maintained in the passage of the light through the concatenation, and the light emerges at the far end with an SOP that is in general different from that with which it was launched. The emergent SOP for one of the single transit time launch SOPs is orthogonal to the emergent SOP for the other single transit time launch SOP. For any launch SOP that is not one of the single transit time launch SOPs, the emergent light is composed of two components (polarisation modes), generally of unequal amplitude, which have propagated through the concatenation with different transit times, respectively the previously mentioned fast and slow single transit times of the concatenation.

By analogy with the single uniform birefringence element situation, the two single transit time launch SOPs for the concatenation are often referred to as the principal SOPs of the concatenation. Having regard to the fact that for such a concatenation the single transit time input (launch) SOPs are, in general, different from the corresponding output (emergence) SOPs, reference in this specification will be made to input principal SOPs (IPSPs) and to output principal SOPs (OPSPs). From consideration of principles of reciprocity, it will be evident that the IPSPs for one direction of propagation through the concatenation are the OPSPs for the other, and vice versa.

The presence of first order polarisation mode dispersion (PMD) in a transmission path—the difference between the fast and slow single transit times (DGD)—is liable to be a problem when its magnitude becomes significant compared with the bit period of traffic propagating in the transmission path. Under these circumstances there will be significant pulse broadening at the receiver when bits are launched into the transmission path with an SOP that the transmission path divides into fast and slow single transit time components (modes) of equal power. In principle, this pulse broadening effect could be avoided by taking steps to ensure that the bits are always launched into the transmission path with SOPs matched with one of the IPSPs of the transmission path so that they always propagate, either exclusively with the fast transit time, or exclusively with the slow one, i.e. so that they always propagate in a single mode. However there are difficulties with achieving this in practice. The primary reason for this is that the IPSPs vary with time, and so an active SOP alignment system would be required. Additionally, identification of the IPSPs typically requires access to both ends of the transmission path, and so the active SOP alignment system situated at the transmitter end of the transmission path would require a feedback control signal from the receiver end of that transmission path.

An alternative approach to the avoidance of the problems presented by first order PMD is a compensation approach that involves allowing the bits to be launched into the transmission path with an SOP that the transmission path divides into two components (modes) propagating with different (fast and slow) transit times, and providing an active system at the receiver end which separates the two components, subjects the separated components to controlled variable differential delay to restore synchronisation of the components, and then recombines them.

An example of the PMD compensation approach is described in U.S. Pat. No. 5,659,412. At the receiver, the signal received from the transmitter via the transmission path is fed to a polarisation beam splitter via a polarisation state controller The outputs of the polarisation beam splitter are fed to separate detectors provided with associated clock extraction circuits, and the phase relationship between the two extracted clock signals is determined. The resulting phase difference signal is used to control the polarisation state controller in such a way as to maximise the phase difference. This phase difference is at a maximum when the polarisation state controller is operative to map the OPSPs of the transmission path on to the principal polarisation states of the polarisation beam splitter, and under these conditions the polarisation beam splitter is operative to separate the component of the signal launched into the transmission path that propagates through it with the 'fast' transit time from the component that propagates through it with the 'slow' transit time. In one of the embodiments specifically described, the electrical output of the detector providing the phase-leading clock signal is delayed by the amount corresponding to the measured phase difference between the two extracted clock signals, the DGD, and then the two electrical signals are combined. In the other embodiment specifically described, the two detectors receive only a tapped fraction of the total optical power outputs from the polarisation beam splitter, while the remainder of that power, after the imposition of an optical delay upon the leading component, is optically combined and detected using a third detector. Thus it is seen that the approach of U.S. Pat. No. 5,659,412 necessarily requires the use of at least two detectors capable of operating at the bit rate, some embodiments requiring three such detectors. Moreover operation of the device is complicated by the need to allow for the occurrence of occasions in which either one of the IPSPs of transmission path approaches and passes through coincidence with the SOP of the signal being launched into that transmission path. Under these conditions there is a large disparity in power level between the two outputs of the polarisation beam splitter.

Another option similarly involves allowing the bits to be launched into the transmission path with an SOP that the transmission path divides into two components (modes) propagating with different (fast and slow) transit times, and providing an active polarisation controller at the receiver end. However in this instance the output of the polarisation controller is fed to a birefringent element of fixed, rather than variable DGD. Under these circumstances the adverse effects of first order PMD are not eliminated, but are merely alleviated. This is because whenever the DGD of the transmission path differs from that of the birefringence element, that birefringence element can provide only partial compensation, rather than complete compensation.

An example of this type of partial compensation option is described in the specification of U.S. Pat. No. 5,473,457. This specification describes using a length of polarisation maintaining fibre as the fixed DGD birefringent element, and the data is impressed as amplitude modulation of an optical carrier which is itself frequency modulated in order to provide a control signal at the receiver which can be used for regulating the polarisation controller. This frequency modulation is a significant drawback not least because it adds to the bandwidth of the data.

Another example of this type of partial compensation option is described by T Takahashi et al in an article entitled 'Automatic compensation technique for timewise fluctuating polarisation mode dispersion in-line amplifier systems', Electronics Letters, Vol. 30, No 4 pp 348–9, Feb. 17, 1994. These authors similarly employ a length of polarisation maintaining fibre as their fixed DGD birefringent element, but generate their control signal for regulating the operation of the polarisation controller by deriving a measure of the magnitude of the frequency component of the detected signal at the receiver that corresponds to half the bit-rate, specifically the frequency component at 5GHz for a 10Gbit/s data rate. A disadvantage of this approach to generating the control signal required for regulating the polarisation controller is the limited response speed that can be obtained for this form of control signal generation. In this context it may be noted that, while the DGD of overhead and land cables may be expected to move with periods of the order of minutes or hours, the IPSPs can be expected to move with periods of the order of seconds, while, in the case of exposed fibres that are subject to being accidentally knocked, the corresponding period is liable to be sub-second.

SUMMARY OF THE INVENTION

An object of the invention is to provide a method of PMD compensation using a polarisation controller in association with a variable DGD compensation element, but without having to have recourse to the use of more than one detector for generating a control signal for regulating the polarisation controller and the DGD compensation unit.

A further object of the invention is to provide a method of PMD compensation using a polarisation controller in association with a fixed DGD compensation element, the method affording the capability of relatively fast control response times.

These objectives are accomplished by arranging to modulate the polarisation state of light launched into the transmission path. This modulation is of a form that, when represented on a Poincaré sphere, has an oscillatory rotational component at a frequency $f_1$ about a first axis of the sphere, and an oscillatory rotational component at a frequency $f_2$ about a second axis of the sphere that is orthogonal to the first axis, and where $f_1 \neq f_2$, $f_1 \neq 2f_2$, and $f_2 \neq 2f_1$.

Other features and advantages of the invention will be readily apparent from the following description of preferred embodiments of the invention from the drawings and from the claims.

DETAILED DESCRIPTION OF PREFERRED EMBODIMENTS

Figure 1:
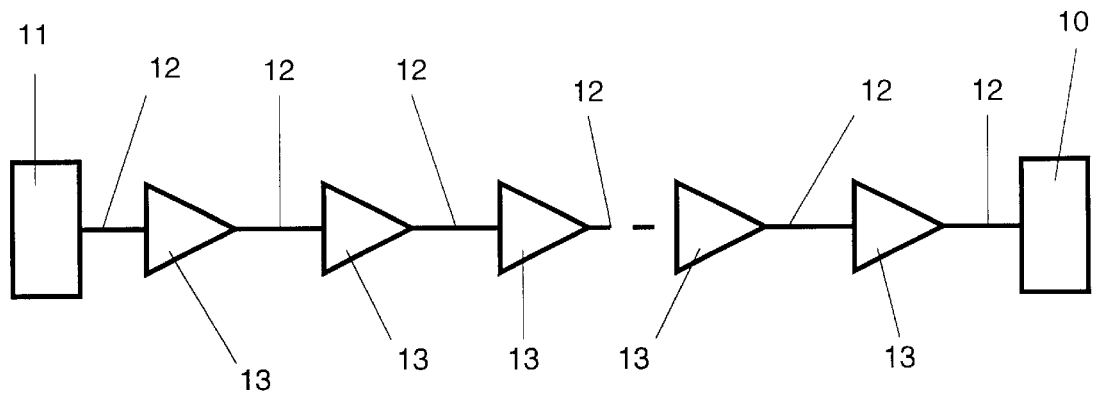
FIG. 1 is a schematic diagram of an optical transmission system.
Figure 2:
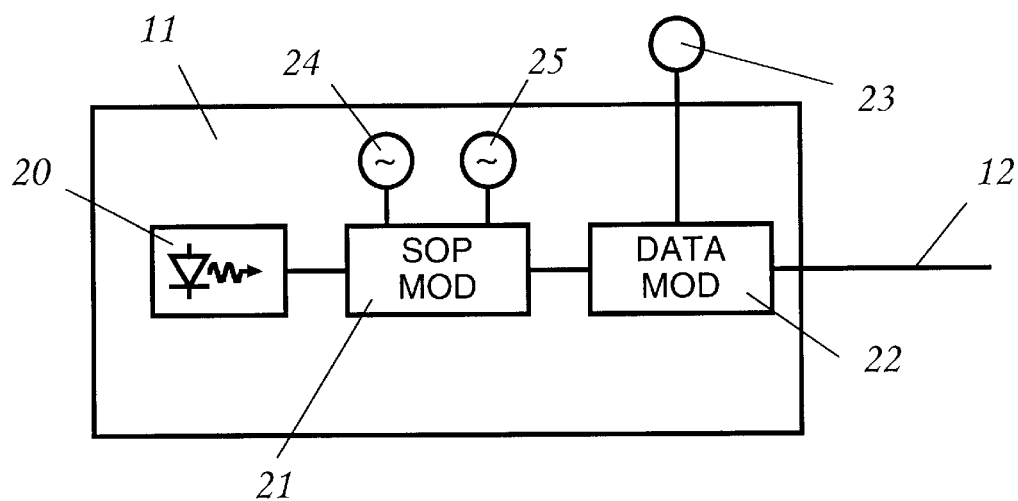
FIGS. 2 and 3 are schematic diagrams respectively of the transmitter and receiver of the optical transmission system of FIG. 1, FIGS. 4, 5 and 6 are Poincaré diagrams illustrating the SOP modulation applied by the SOP modulator of the transmitter of FIG. 2.

Referring to FIG. 1, and optical receiver 10 is optically coupled with an optical transmitter 11 via an optical fibre transmission path 12 that exhibits polarisation mode dispersion (PMD) and that may include along its length one or more optical amplifiers 13, for instance optically pumped erbium doped fibre amplifiers. The major components of the optical transmitter 11 are schematically depicted in FIG. 2, and comprise an optical source 20 emitting polarised light, such as a semiconductor laser diode; a polarisation state modulator 21; and a data modulator 22 that digitally modulates the optical output of the optical source 20 with clocked data applied by way of terminal 23. (In FIG. 2, the polarisation state modulator 21 is specifically illustrated as preceding the data modulator 22, but it may be preferred, or indeed necessary, to reverse this order. For instance, the reverse order is necessary if the data modulator is of a form that requires a specific SOP, such is generally the case in respect of lithium niobate modulators.) The polarisation modulator is driven by two oscillators 24 and 25 respectively operating at frequencies $f_1$ and $f_2$, where $f_1 \neq f_2$, $f_1 \neq 2f_2$, and $f_2 \neq 2f_1$. The output of oscillators 24 and 25 are employed by the SOP modulator 21 to modulate the SOP of the light directed into the modulator in a manner which, when represented on a Poincaré sphere, have oscillatory rotational components respectively at the frequencies $f_1$ and $f_2$ respectively about first and second orthogonal axes of the sphere.

Figure 3:
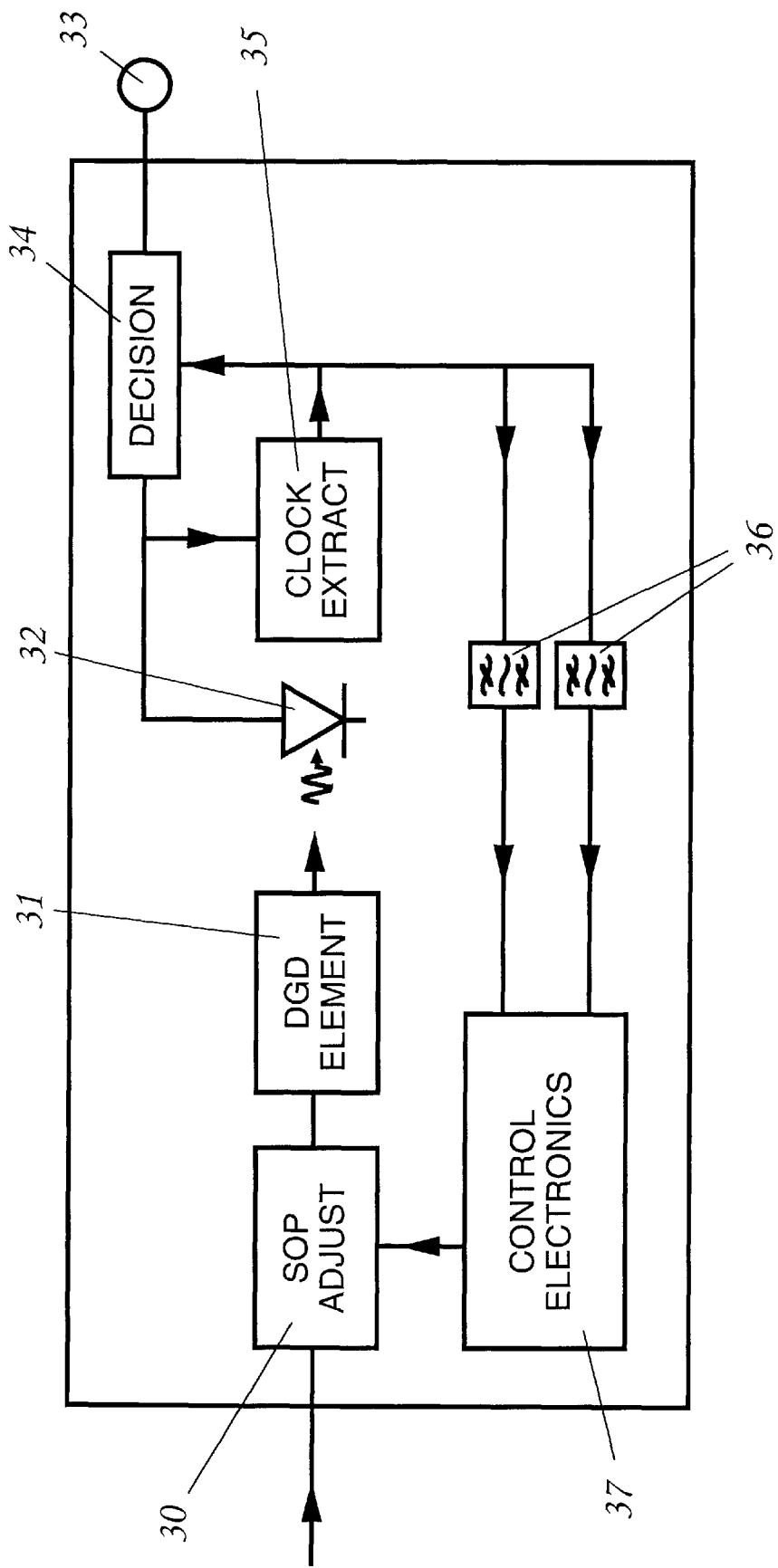

Correspondingly, the major components of the optical receiver 10 are schematically depicted in FIG. 3, and comprise an SOP adjuster 30, a DGD compensation element 31 a photodetector 32 whose electrical output is fed to an output terminal 33 of the receiver via decision circuitry 34, and also to a clock extraction circuit 35. The output of the clock extraction circuit provides a clock input signal to regulate the operation of the decision circuitry 34, and is also fed to two filters 36 respectively tuned to the frequencies $f_1$ and $f_2$. The outputs of these two filters are fed as control signals to control electronics 37 that regulates the operation of the SOP adjuster 30.

Figure 4:
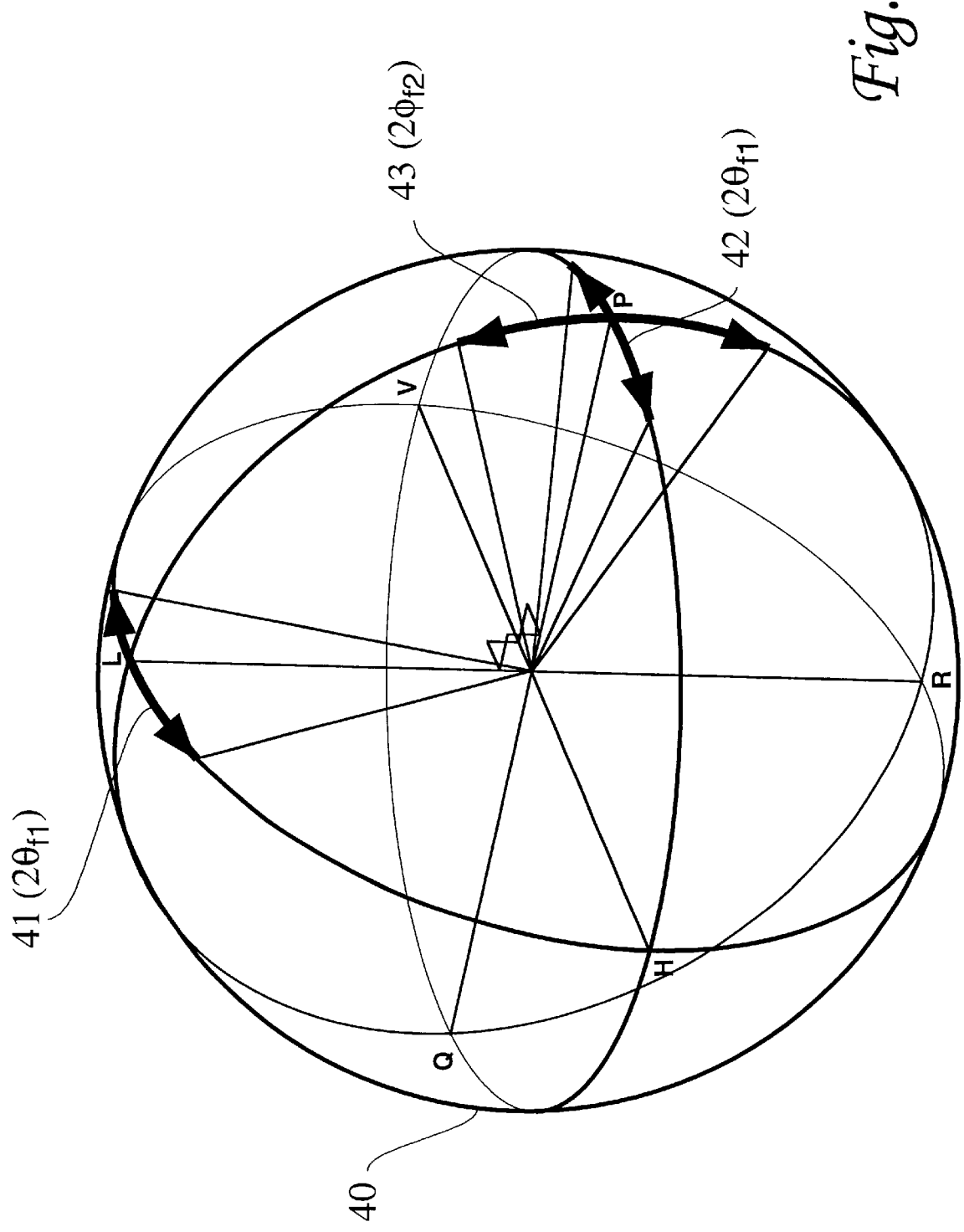
Figure 5:
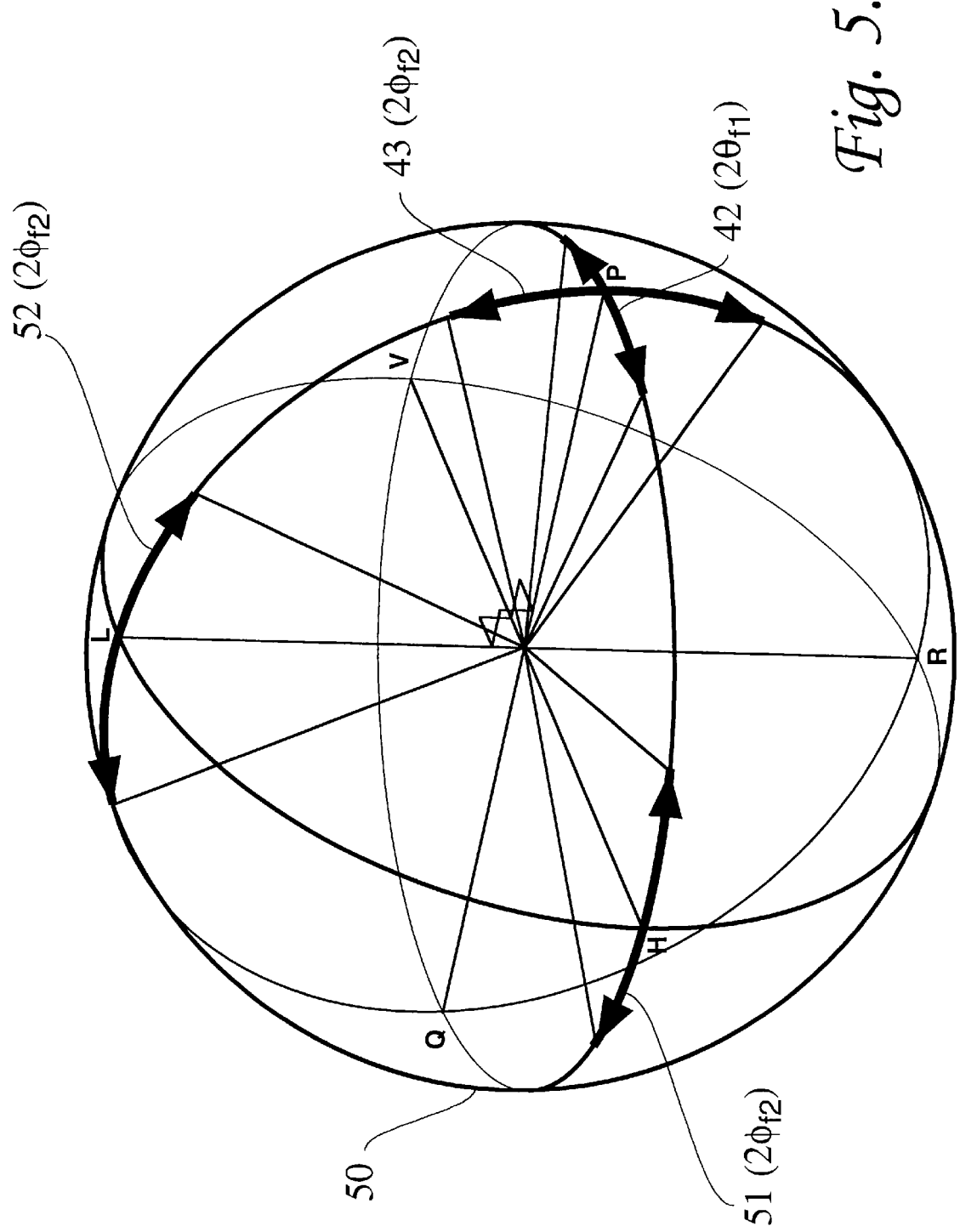

The way in which the SOP modulation at frequencies $f_1$ and $f_2$ provided by the SOP modulator 21 of the transmitter 20 gives rise to amplitude modulation, at frequencies $f_1$, $f_2$, $2f_1$, and $2f_2$, of the clock signal extracted at the receiver 10 by clock extraction circuitry 35 is conveniently explained by reference to the Poincaré sphere diagrams of FIGS. 4, 5 and 6. A Poincaré sphere is a way of representing all possible states of polarisation of light (linearly, circularly and elliptically polarised states) as points on the surface of a sphere. In the case of the Poincaré sphere 40 of FIG. 4 the poles L and R represent circularly polarised states. On the great circle 'equator' through HQV and P are represented all the linearly polarised states, and between the poles and the equator lie all the elliptically polarised states. It may be noted that any pair of orthogonally polarised states lie at diametrically opposed points on the Poincaré sphere. When polarised light is transmitted through a medium exhibiting uniform birefringence, the SOP with which the light is launched into the medium is generally different from that with which the light emerges from that medium. However there is a particular pair of orthogonal SOPs for which launch and emergence SOPs are identical. These two orthogonal SOPs are termed eigenstate SOPs, and define the eigenaxis of that medium. The change in SOP produced by passage of polarised light through the medium is represented by a rotation on the Poincaré sphere about the eigenaxis through an angle determined by the strength of the birefringence. In the case of materials exhibiting linear birefringence, such as a uniaxial crystal of calcite, the eigenstates are linearly polarised SOPs, and so the eigenaxis lies in the equatorial plane of the Poincaré sphere of FIG. 4. Linear birefringence is also exhibited by optical fibre that does not possess perfect circular symmetry, for instance as the result of providing the fibre core with a structure producing a non-circularly symmetric lateral component of strain. In this instance the strength of the linear birefringence exhibited by the fibre is adjustable by the application of an adjustable amount of additional lateral strain, for instance by squeezing the fibre. If therefore the light from the source 20 enters the SOP modulator 21 in the form of linearly polarised light, the SOP modulator may be composed of two frequency modulated squeezer elements, for instance piezoelectrical squeezer elements operating in tandem upon the fibre. In respect of one preferred embodiment, if the SOP of the light entering the SOP modulator 21 is represented by the point H on the Poincaré sphere 40 of FIG. 4, then the orientation of the first piezoelectric squeezer element of the SOP modulator 21 is oriented so that its eigenaxis lies along the line PQ. The mean retardation provided by this first squeezer element is chosen to be $\lambda/4$, and so is represented on the Poincaré sphere as $\pi/2$ rotation in the clockwise sense as seen from the P end of the eigenaxis. Superimposed upon this $\pi/2$ rotation is an oscillatory modulation at the frequency $f_1$ of an amplitude. that corresponds to the sweeping out of an arc 41 on the Poincaré sphere 40 that lies on the great circle through HLV and P, is centred on L, and subtends an angle $2\theta$ at the centre of the sphere. The second piezoelectric squeezer element of the SOP modulator 21 is then oriented so that its direction of squeeze is aligned at $\pi/4$ with respect to that of the first squeezer element. The eigenaxis of the second squeezer element is therefore at $\pi/2$ on the Poincaré sphere with respect to that of the first squeezer element, i.e. the eigenaxis of the second squeezer element is along the direction HV. The mean rotation provided by this second squeezer element is also chosen to be $\lambda/4$ and is represented on the Poincaré sphere as a $\pi/2$ rotation in the clockwise sense as seen from the H end of its eigenaxis. The arc 41 is therefore mapped on to the position of arc 42 which lies on the equatorial great circle through HQV and P, is centred on P, and similarly subtends an angle $2\theta$ at the centre of the sphere. Superimposed on this $\pi/2$ rotation is an oscillatory modulation at the frequency $f_2$ of an amplitude that, in the absence of the $f_1$ modulation of the first squeezer element, corresponds to the sweeping out of an arc 43 which lies on the great circle through QLP and R is centred on P and subtends an angle $2\phi$ at the centre of the sphere.

It is not necessary for both retarders of the SOP modulator to be variable strength linear birefringence retarders. Either or both may alternatively be variable strength circular birefringence retarders. Such a device may for instance be constituted by a Faraday rotator. An alternative form of variable strength circular birefringence retarder, one which does not employ bulk optics, but in which the light propagates from end to end in an optical fibre, is the type of device described in U.S. Pat. No. 5,115,480 with particular reference to its FIGS. 1, 2 and 3.

The manner of operation of an alternative embodiment of SOP modulator 21, one that employs a pair of variable strength circular birefringence retarders, will now be explained with reference to the Poincaré sphere of FIG. 5. As before, the light entering the SOP modulator is plane polarised in a direction represented by the point H. The first variable strength circular birefringence retarder of the SOP modulator is driven with an oscillatory signal of frequency $f_2$ with an amplitude that corresponds to the sweeping out of an arc 51 on the Poincaré sphere 50 that lies on the equatorial great circle through HQV and P, is centred on H, and subtends an angle $2\phi$ at the centre of the sphere. Between this first variable strength circular birefringence retarder and the second are located two quarter-wave (fixed strength) linear birefringence retarders. The first of these quarter-wave retarders is oriented at 45° to the first so that, on the Poincaré sphere, its eigenaxis is aligned in the direction PQ, and so this quarter-wave retarder has the effect of mapping the arc 51 on to the arc 52 that lies on the great circular through HLV and R, is centred on L, and similarly subtends an angle $2\phi$ at the centre of the sphere. The second of the quarter-wave linear birefringence retarders is oriented so that, on the Poincaré sphere, its eigenaxis is aligned in the direction HV. Accordingly this second quarter-wave retarder has the effect of mapping the arc 52 on to the arc 43, that lies on the great circle QLP and R, is centred on P, and also subtends an angle 2φ at the centre of the sphere. The second variable strength circular birefringence retarder is driven with an oscillatory signal of frequency $f_1$ with an amplitude that, in the absence of the $f_2$ modulation of the first variable strength circular birefringence retarder, corresponds to the sweeping out of the arc 42 which lies on the equatorial great circle through HQV and P, is centred on P, and subtends an angle 2θ at the centre of the sphere.

Figure 6:
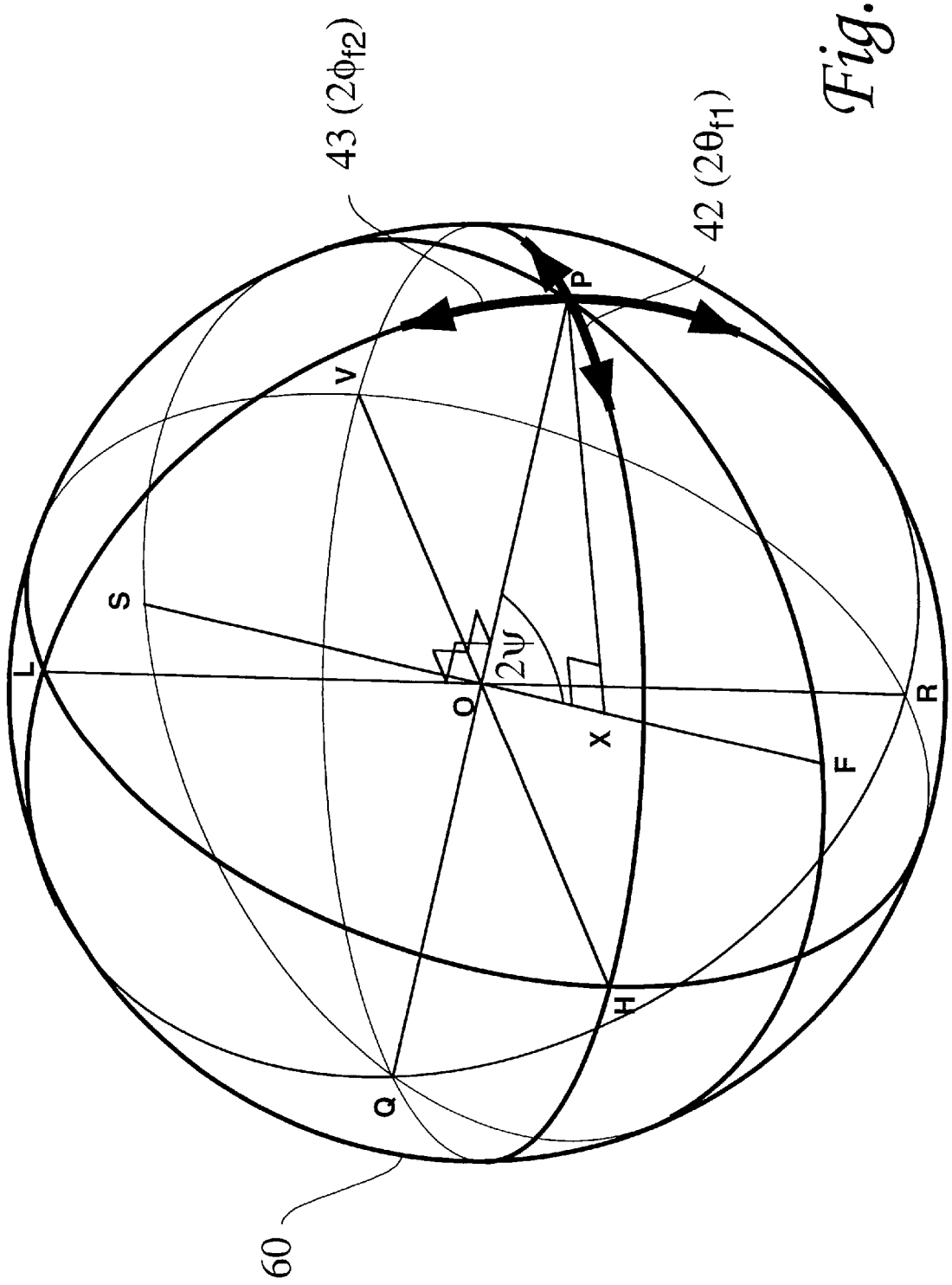

Referring now to the Poincaré sphere 60 of FIG. 6, it is assumed, for simplicity of analysis, that the output from the SOP modulator is applied directly to the input of the PMD transmission path 12 without any intervening change of SOP. Accordingly the input SOP to the transmission path has a mean state corresponding to the linearly polarised state P. The transmission path has fast and slow IPSPs (launch principal SOPs) that in the course of time are liable to wander all over the surface of their sphere while at all time remaining diametrically opposed to each other. At some instant these fast and slow IPSPs may be represented in the Poincaré sphere respectively at locations F and S.

Ignoring in the first instance the polarisation state modulations at frequencies $f_1$ and $f_2$, light is being launched into the PMD transmission path 12 with an SOP given by point P, and at this instant neither of the IPSPs is coincident with P. Therefore some of the light propagates through the transmission path 12 with the fast transit time, while the remainder propagates through with the slow transit time. The amplitudes of the fast and slow components is determined by the angle PÔS=2ψ between the PQ and FS axes. The amplitude of the fast component varies with sin 2ψ, while that of the slow component varies with cos 2ψ.

The effect of the SOP modulations at frequencies $f_1$ and $f_2$ is to produce a modulation of the division of optical power between the component propagating through the PMD transmission path with the fast transit time and the component propagating through it with the slow transit time. The manner in which the arises may easily be seen by considering certain specific orientations of the FS axis defined by the IPSPs. If this FS axis is aligned with the HV axis, then 2ψ=π/2, with the result that the launch power is divided equally between the component propagating through the PMD transmission path 12 with the fast transit time, and the component propagating with the slow transit time. The SOP modulation at frequency $f_2$ described by arc 43 does not involve any modulation of the angle 2ψ, and therefore the division of power between the fast and slow transit time components is unaffected by this SOP modulation at frequency $f_2$. This SOP modulation at frequency $f_2$ described by arc 43 will similarly involve no modulation of the angle 2ψ for any orientation of the FS axis lying in the equatorial plane containing HQV and P. On the other hand, the SOP modulation at frequency $f_1$ described by arc 42 will produce a corresponding modulation (by ±θ) of the angle 2ψ, and so will produce a corresponding modulation of the division of power between the fast and slow transit time components propagating through the PMD transmission path 12. When 2ψ=π/2 (i.e. when the FS and HV axes are aligned) the division of power modulation is, for small values of π, related approximately linearly to the SOP modulation frequency $f_1$, and so the ratio of the division of power modulation at $2f_1$ to that at $f_1$ is small. This ratio increases to a maximum as the orientation of the FS is swept round in the equatorial plane into alignment with the PQ axis (i.e. as 2ψ is reduced from 2ψ=π/2 to 2ψ=0).

Figure 7:
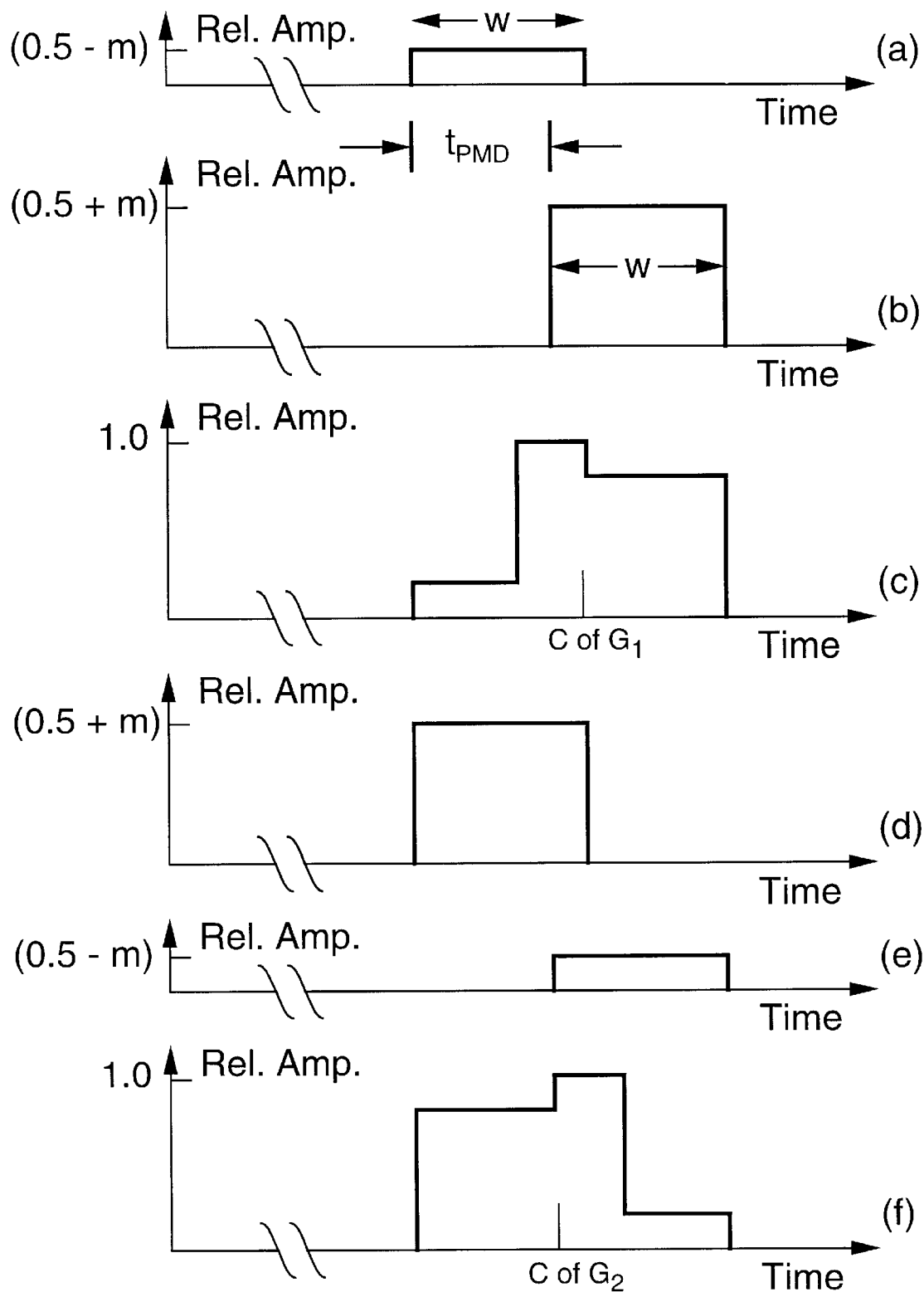
FIG. 7 depicts a set of timing diagrams illustrating how the alteration of the division of power between the fast and slow transit time components of pulses suffering PMD affects the timing of their centres of gravity.

Attention is now returned to the situation in which the FS axis is aligned with the HV axis and a pulse of light of pulse width ω is launched into the PMD transmission path 12 from the transmitter 11. The angle 2ψ=π/2, and so when the pulse emerges from the far end of the PMD transmission path 12, it is found to be composed of two equal amplitude components which have propagated through the transmission path 12 with different transit times. The SOP modulation at $f_1$ described by arc 42 modulates the angle ψ over the range π/2±θ. The timing diagrams (a) and (b) of FIG. 7 depict the response of the photodetector 30 respectively to the arrival at the receiver 10 of the fast transit time component and to that of the slow transit time component for the launch SOP condition corresponding to the end of the arc 42 that is nearer V, i.e. when 2ψ=π/2+θ. The response to the fast transit time component is ahead of that to the slow transit time component by the differential group delay time $t_{DGD}$, which is the polarisation mode dispersion of the transmission path 12. Because in this instance 2ψ>π/2, the relative amplitude of the response of the photodetector 30 to the fast transit time component (0.5−m) is smaller than that of its response to the slow transit time component (0.5+m). The resultant of these two responses is shown in timing diagram (c) of FIG. 7, and it can readily be shown that the centre of gravity, $CofG_1$, of this resultant response is delayed m×$t_{DGD}$ with respect to the centre of gravity (not shown) pertaining when 2ψ=π/2.

The timing diagrams (d) and (e) of FIG. 7 depict the response of the photodetector 30 respectively to the arrival of the fast and slow transit time components for the launch SOP condition corresponding to the other end of the arc 42, the end nearer H, i.e. when 2≠=π/2−θ. The resultant of these two responses is shown in timing diagram (f) of FIG. 7, and it can readily be shown that the centre of gravity, $CofG_2$, of this resultant response is advanced m×$t_{DGD}$ with respect to the centre of gravity pertaining where 2ψπ/2.

The clock extraction circuit 35 produces clock pulses that have a centre of gravity centred on the average timing of a preceding train of pulses, and so it is seen that, provided that frequency $f_1$ is long compared with the duration of the pulse train averaged by the clock extraction circuit, the clock output will have a modulation component at frequency $f_1$ whose amplitude is directly related to the magnitude of the PMD exhibited by transmission path 12.

From the foregoing, it is evident that, if the SOP modulation amplitude θ is known, it is in principle possible to determine the magnitude of the PMD exhibited by transmission path to be determined from a measure of the magnitude of the $f_1$ component of the extracted clock signal whenever the IPSPs are known to be aligned with the HV axis. On its own, this lacks practical utility in the absence of knowledge as to when the IPSPs are so aligned with the HV axis, but the situation can be somewhat generalised by additionally taking into account the amplitudes of the components of the clock output at frequencies $f_2$ and $2f_2$. By including knowledge of the magnitudes of these two additional variables i it is possible to determine the magnitude of the PMD for any orientation of the IPSP axis.

The foregoing analysis was predicated on the SOP of the light being launched into the SOP modulator 21 being known and, without loss of generality, the analysis developed by way of specific example for the case in which this known SOP is a linearly polarised state arbitrarily represented by the point P on the Poincaré sphere. If however for some reason the SOP with which light is launched into the SOP modulator 21 is not known, or is liable to vary with time, then it could be possible for this launch SOP to become aligned with the eigenaxis of one of the two variable strength birefringence elements of the SOP modulator 21. Under these conditions the modulation of the birefringence strength of that particular element would produce no corresponding modulation of the output SOP of the SOP modulator. The problem that this possibility presents can however be circumvented by providing the SOP modulator 21 with a third variable strength birefringence element modulated at a frequency $f_3$, where $f_1 \neq f_3 \neq f_2$, $2f_1 \neq f_3 \neq 2f_2$ and $f_1 \neq 2f_3 \neq f_2$, and arranged so that its eigenaxis is orthogonal with respect to the eigenaxes of the other two variable strength birefringence elements of SOP modulator 21.

The foregoing analysis has not taken account of the birefringence of the SOP adjuster 30 and that of the DGD compensation element 31. A rigorous analysis treats them as incorporated as part of an extended transmission path, a path that extends all the way from the transmitter 11 to the detector 32 of the receiver 10. An alternative way of considering the effect of the adjuster 30 and compensation element 31 is to treat the adjuster as an element that can map the OPSPs of the transmission path 12 on to the IPSPs of the compensation element 31. If the DGD of the compensation element matches that of the transmission path 12, and if the adjuster 30 is able to map the fast transit time OPSP of the transmission path 12 on to the slow transit time IPSP of the compensation element, then the extended transition path between the transmitter 11 and the detector 32 of the receiver 10 (i.e. the series combination of the transmission path 12, the SOP adjuster 30 and the compensation element 31) has a zero DGD. Thus the effect of the SOP adjuster and the compensation element has, in these circumstances, been such as to compensate fully for the first order PMD of the transmission path 12.

Figure 8:
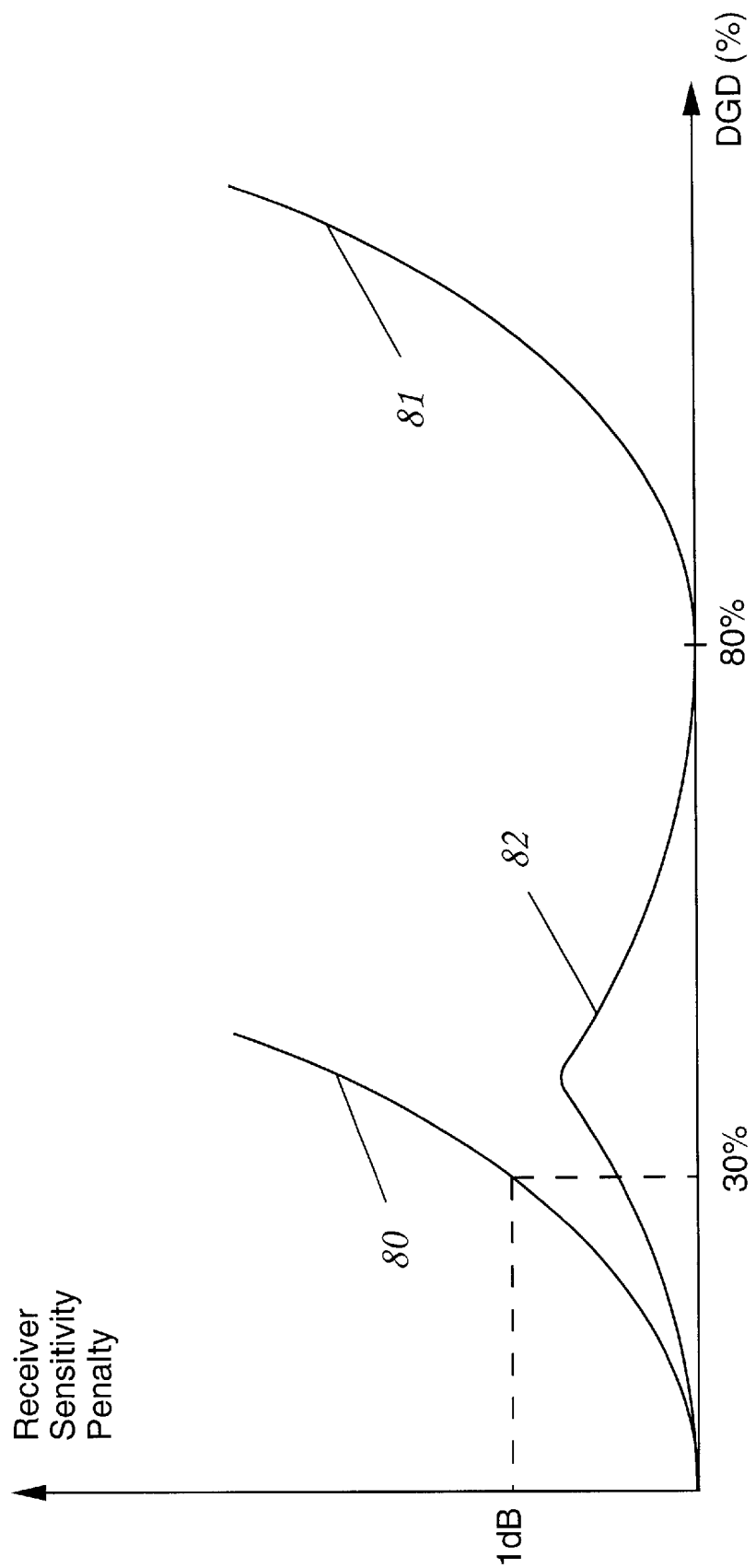
FIG. 8 is a plot of worst case receiver sensitivity penalty plotted as a function of polarisation path PMD both in respect of an uncompensated transmission system and in respect of a PMD compensated system using fixed amplitude PMD compensation.

Perfect compensation of this sort may be more than is truly necessary in a practical situation if a less perfect alternative can be implemented in a less expensive way, and yet still provide acceptable performance. A convenient way of assessing performance is in terms of receiver sensitivity penalty. Trace 80 of FIG. 8 depicts a typical receiver sensitivity penalty (increase in receiver received signal power required to meet a given bit error rate) characteristic plotted as a function of DGD expressed as a percentage of bit period, this characteristic being in respect of a notional uncompensated transmission path under worst case conditions (i.e. under the condition that the signal launched into this notional transmission path is launched with an SOP that this notional transmission path divides into fast and slow transit times components of equal amplitude.

From this trace it is seen that there is a 1 dB penalty in receiver sensitivity when the DGD has reached about 30% of the bit period, i.e. for a 10Gbit/s system the power requirement at the receiver to achieve a specific BER (e.g. $10^{-9}$) in the absence of any DGD has to be increased by 1 dB.

Consider now the situation in which the transmission path 12 is followed by the SOP adjuster 30 and DGD compensation element 31 having a specific fixed value of DGD, for instance 80%, constituted for instance by a specific length of polarisation maintaining fibre. For the extended transmission path comprising the series combination of the transmission path 12, the SOP controller 30 and the compensator element 31, it is evident that optimum operation of the SOP controller 30, for transmission path 12 DGD values in excess of the specific DGD of the (fixed DGD) compensation element 31, produces a receiver sensitivity penalty characteristic given by trace 81. Trace 81 is a replica of trace 80, but shifted on the % DGD axis by 80%. At first sight it might be thought that the corresponding characteristic for transmission path 12 DGD values less than the specific DGD of the compensation element 31 would be a mirror image of trace 81, but in practice this is not the case.

Trace 81 is a replica of trace 80 because, whenever the DGD of transmission path 12 is greater than that of compensation element 31, it is evident that the best compensation that can be effected is that which occurs when the SOP adjuster 30 is operating to map the slow OPSP of transmission path 12 on to the fast IPSP of the compensation element 31, i.e. operation which directly subtracts the DGD of compensation element 31 from the DGD of the transmission path 12. A different situation pertains in respect of DGD values of the transmission path 12 significantly less than that of the compensation element 31. In particular, it can be seen that, if the DGD of the transmission path 12 is very small in comparison with that of the compensation unit 31, and if the SOP adjuster 30 were to operate so as to map the slow OPSP of the transmission path 12 on to the fast IPSP of the compensation element 31, then the worst case condition is that of a launch SOP into the transmission path 12 that launches equal power into fast and slow polarisation modes of the transmission path 12. The SOP adjuster then ensures that equal power is launched into the slow and fast modes of the compensation element 31. The resulting DGD of the extended transmission path is thus only slightly less than that of the compensation element 31. On the other hand, if the controller were to operate so as to launch all the fast polarisation mode power emerging from the transmission path 12, together with all the slow mode power, into one of the IPSPs of the compensation element 31, the resulting DGD of the extended transmission path has the significantly smaller value of that of the transmission path 12. The receiver sensitivity penalty is therefore also correspondingly significantly smaller. Modelling indicates that, for this extended transmission path (constituted by the series combination of the transmission path 12, the SOP adjuster 30 and the compensation element 31) the receiver sensitivity penalty characteristic, for values of transmission path 12 DGD less than that of the (fixed DGD value) compensation element 31 has the general shape given by trace 82. (The position and height of the maximum of trace 82 is representative only, and is not to scale.) FIG. 8 depicts one trace 81 and one trace 82 for a single specific DGD value of a specific fixed DGD value compensation element 31. For different specific values there will be correspondingly different traces 81 and 82 constituting a family of such traces, the family having the property that increasing the specific DGD value shifts the receiver sensitivity penalty minimum positioned at the junction between traces 81 and 82 rightwards (i.e. to larger values of transmission path 12 DGD), while at the same time increasing the maximum value of trace 82 (i.e. increasing the maximum worst case receiver sensitivity penalty that can occur for transmission path 12 DGD values less than that of the compensation element 31). Therefore, for any given transmission path 12 for which it is known that the DGD can reach, but never exceed, a certain specific value, there is an optimum specific value of DGD for the (fixed value) compensation element 31 that minimises the worst case maximum value of receiver sensitivity penalty that can be encountered in the compensated system. However if the transmission path 12 becomes subject to an increased value of DGD that can be reached, but never exceeded, then the corresponding optimum specific value of DGD for the compensation unit is correspondingly increased. A corollary of this is that the worst case maximum value of receiver sensitivity penalty that can be encountered is also increased. Clearly if this worst case maximum value is, in specific circumstances, too large to be acceptable, the approach employing the compensation element 31 with a fixed DGD value is inadequate in these particular circumstances. A more complicated compensation approach is required, an approach that involves the use of a controllable variable DGD compensation element.

Figure 9:
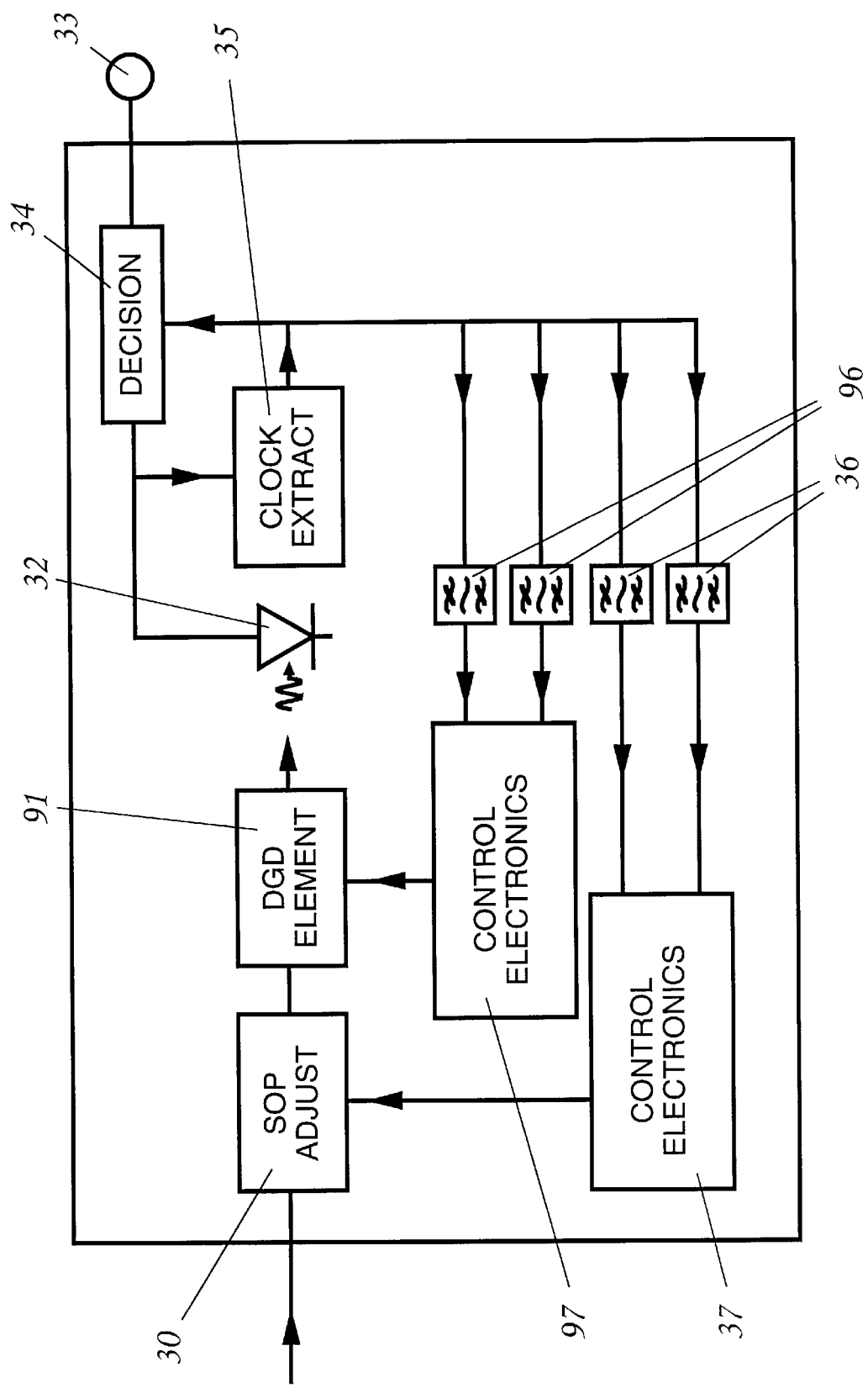
FIG. 9 is a schematic diagram of an alternative form of receiver of the transmission system of FIG. 2, and FIGS. 10 and 11 are schematic diagrams of alternative forms of controllable variable birefringence PMD compensation element employed in the receiver of FIG. 9.

The receiver of FIG. 9 differs from that of FIG. 3 in that a controllable variable DGD value compensation element 91 is substituted for the fixed DGD value compensation element 31 of the receiver of FIG. 3. Additionally the receiver of FIG. 9 is provided with a further two filters 96, respectively tuned to the frequencies $2f_1$ and $2f_2$, and further control electronics 97. Just as the control electronics 37 regulates the operation of the SOP adjuster 30, using for the purpose input signals received from the clock extraction circuit 35 via the filters 36; so the control electronics 97 regulates the operation of the DGD compensation element 31, using for the purpose input signals received from the clock extraction circuit 35 via the filters 96.

In both the receiver of FIG. 3 and that of FIG. 9 the SOP adjuster 30 is a controllable variable birefringence device controlled by its associated control electronics 37 and having the flexibility of variability such that any given SOP of light applied to the adjuster can be converted by it in an endless manner to emerge with any required output SOP. The control exercised by the control electronics 37 is a birefringence exploration designed to home in on the particular birefringence state of the SOP adjuster that at that time simultaneously minimises the amplitudes of the frequency components of the extracted clock signal from the clock extraction circuit 35 at frequencies $f_1$ and $f_2$.

In the receiver of FIG. 9 the controllable variable DGD compensation element 91 ia a device controlled by its associated control electronics 97, and the control exercised by the control electronics 97 is a DGD magnitude exploration designed to home in on the particular DGD value that at that time simultaneously minimises the amplitudes of the frequency components of the extracted clock signal from the clock extraction circuit 35 at frequencies $2f_1$ and $2f_2$.

Figure 10:
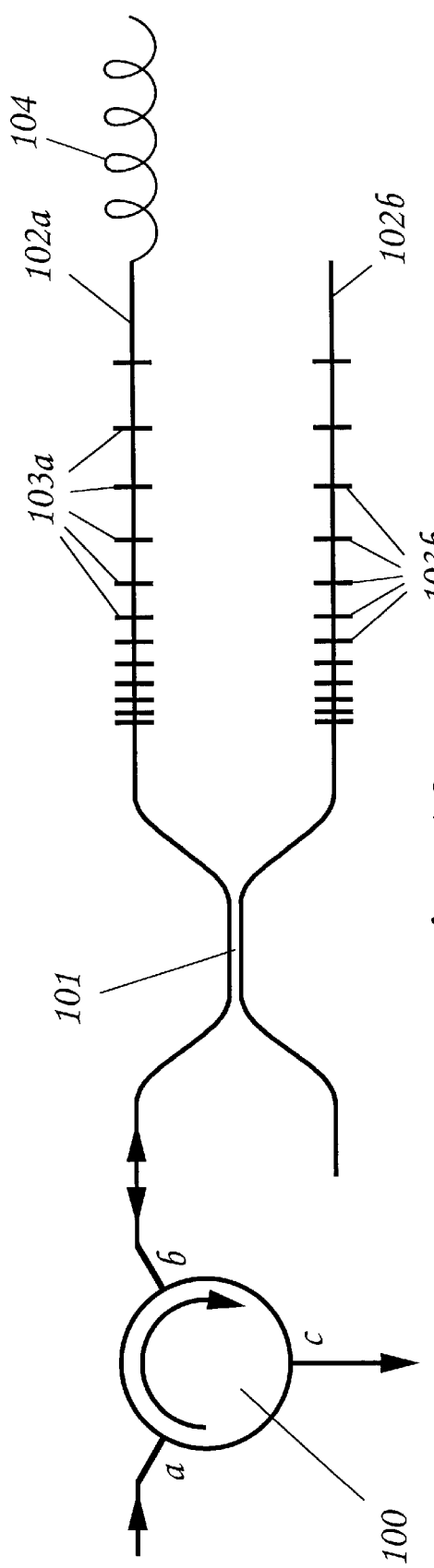

One physical form that the controllable variable DGD compensation element 91 can take is a form schematically illustrated in FIG. 10. This comprises a polarisation independent circulator 100 having ports 'a', 'b' and 'c', a polarisation beam splitter 101, a pair of optical fibres 102*a* and 102*b* provided with chirped Bragg reflection gratings 103*a* and 103*b*, and controllable extension means 104 for differentially axially straining the optical fibres 102. This extension means may for instance take the form of a piezoelectric stretcher element. Light that is launched in port 'a' of the circulator 100 emerges from port 'b', and is resolved by the polarisation beam splitter 101 into orthogonally polarised components which propagate respectively in the fibres 102*a* and 102*b*. These components are reflected by the Bragg gratings 103*a* and 103*b*, and are recombined by the beam splitter 101, which launches them back into the circulator 100 to emerge by way of its port 'c'. If the two fibres are identical, and if also the two chirped gratings are both identical and equidistant from the polarisation beam splitter, then, in the absence of any differential straining of the fibres, it is clear that the compensation element 91 will exhibit no DGD because both components will be reflected at the same distance along their respective fibres 102*a* and 102*b* from the polarisation beam splitter. Differential axial straining of the two fibres will have the effect of differentially altering the chirps of the two gratings, and hence causing the two components to be reflected at different distances along their respective fibres from the polarisation beam splitter 101. Under these circumstances therefore, the compensation element will exhibit DGD. (It should be clearly understood that, for the compensation element to function as required,it is not necessary to have identical fibres and identical equispaced gratings.) The sensitivity of the compensation element (i.e. the rate of change of DGD with differential strain) is an inverse function of the rate of chirp of the Bragg gratings (i.e. a more gradual chirp provides a greater sensitivity).

The operating principle underlying way the DGD of the compensation element 91 of FIG. 10 operates can be seen to rely upon the use of a small change in the propagation constant of an optical waveguide incorporating a slow rate of chirp chirped Bragg reflection grating so as to produce a significant change in the position along the grating at which any given wavelength of light is reflected. Many variants of the embodiment specifically illustrated in FIG. 10 are evidently possible. For instance the Bragg reflector 103*b* in the unstrained fibre 102 could be replaced by a single discrete broad-band reflector. Another alternative is to substitute a length of polarisation maintaining fibre with a single chirped Bragg reflection grating for the polarisation beam splitter 101 and pair of fibres 102 with their gratings 103, and to bend the polarisation maintaining fibre so as to induce changes in its birefringence beat length.

Figure 11:
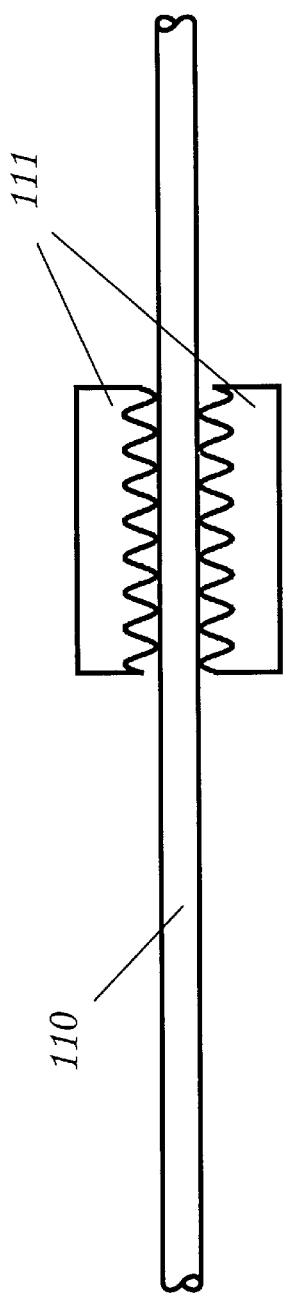

The variable DGD compensation element of FIG. 10 is in principle a device whose DGD can be continuously tuned from zero out to some specific maximum value determined by the particular parameters of its construction. A less complicated, and hence cheaper to implement, variable DGD compensation element will now be described with reference to FIG. 11. The reduction in complexity is obtained at the expense of some reduction of flexibility of DGD adjustment that it is capable of providing. This variable DGD compensation element of FIG. 11 comprises a length 110 of polarisation maintaining fibre and an adjustable strength polarisation modes coupling device located at an intermediate point in its length. The mode coupling device may conveniently be constituted by a pair of anvils 111 urged together with variable strength. The mating faces of the anvils have mating transverse corrugations whose periodicity is matched with the polarisation mode beat length of the fibre 110. When the anvils are far enough apart not to induce any corresponding bending of the fibre, there is no coupling between the two polarisation modes of the fibre 110, and hence this fibre exhibits its maximum DGD, as determined by its physical length and its polarisation mode beat length. When the anvils are urged close enough to induce 100% coupling between the nodes, all the power originally propagating in the fast polarisation mode is coupled across at the coupling region into power propagating thereafter in the slow polarisation mode. Similarly all the power originally propagating in the slow polarisation mode is coupled across to propagate thereafter in the fast polarisation mode. Under these circumstances it is evident that the DGD of that part of the fibre 110 up to the coupling region is therefore offset by the DGD of that part of the fibre after the coupling region. The DGD compensation thereby provided is complete compensation, under-compensation or over-compensation according to whether the coupling regions is located at the mid-point of the length of fibre 110, after this mid-point, or before it. It will be evident that the consequent reduction in DGD exhibited by the fibre 110 in its entirety is diminished if the coupling strength is reduced from its 100% value. By exercising control over the urging together of the anvils 111, there is provided control over the strength of polarisation mode coupling provided at the coupling region, and hence control over the value of DGD provided by the fibre 110.

What is claimed is:

1. A method of transmitting a clocked digital optically polarised signal from a transmitter to a receiver via a transmission path liable to exhibit polarisation mode dispersion (PMD), wherein the signal is launched into the transmission path with its state of polarisation (SOP) modulated in a manner which, when represented on a Poincaré sphere, has an oscillatory rotational component at a frequency $f_1$ about a first axis of the sphere and an oscillatory rotational component at a frequency $f_2$ about a second axis of the sphere that is orthogonal to said first axis, and where $f_1 \neq f_2$, $f_1 \neq 2f_2$, and $f_2 \neq 2f_1$, wherein at the other end of said transmission path the clocked digital optical signal emergent therefrom is fed through an adjustable birefringence element before being detected by a photodetector and fed to a clock extraction circuit to provide a clock signal having frequency components at $f_1$ and $f_2$, which frequency components are employed as control signals in a feedback control loop regulating the birefringence of the birefringent element so as to minimise the amplitude of said frequency components.

2. A method as claimed in claim 1, wherein the adjustable birefringence element includes the series combination of a polarisation state controller and constant birefringence birefringent element.

3. A method as claimed in claim 1, wherein the adjustable birefringence element includes the series combination of a polarisation state controller and variable birefringence birefringent element.

4. A method as claimed in claim 3, wherein the $f_1$ and $f_2$ frequency components of the extracted clock signal are employed as control signals in a first feedback control loop regulating the birefringence of the polarisation state controller so as to minimise the amplitude of said $f_1$ and $f_2$ frequency components, and wherein $2f_1$ and $2f_2$ frequency components of the extracted clock signal are employed as control signals in a second feedback control loop regulating the birefringence of the variable birefringence birefringent element so as to minimise the amplitude of said $2f_1$ and $2f_2$ frequency components.

5. A method as claimed in claim 4, wherein the variable birefringence birefringent element comprises a length of polarisation maintaining fibre provided at an intermediate point in its length with a controllable variable strength polarisation mode coupler.

6. A method of transmitting a clocked digital optically polarised signal from a transmitter to a receiver via a transmission path liable to exhibit polarisation mode dispersion (PMD), wherein the signal is launched into the transmission path with its state of polarisation (SOP) modulated in a manner which, when represented on a Poincaré sphere, has an oscillatory rotational component at a frequency $f_1$ about a first axis of the sphere and an oscillatory rotational component at a frequency $f_2$ about a second axis of the sphere that is orthogonal to said first axis, and where $f_1 \neq f_2$, $f_1 \neq 2f_2$, and $f_2 \neq 2f_1$, wherein at the other end of said transmission path the clocked digital optical signal emergent therefrom is fed through an adjustable birefringence element before being detected by a photodetector and fed to a clock extraction circuit to provide a clock signal having frequency components at $f_1$, $2f_1$, $f_2$, and $2f_2$, which frequency components are employed as control signals in a feedback control loop regulating the adjustment of the birefringence element so as to substantially match the magnitude of its first order PMD with that of the transmission path, and to bring the fast axis input principal state of polarisation (IPSP) of the birefringent element into substantial alignment with the slow axis output principal states of polarisation (OPSP) of the transmission path.

7. A method of transmitting a clocked optically polarised signal from a transmitter to a receiver via a transmission path liable to exhibit polarisation mode dispersion (PMD), wherein the signal is launched into the transmission path with its state of polarisation (SOP) modulated in a manner which, when represented on a Poincaré sphere; has an oscillatory rotational component at a frequency $f_1$ about a first axis of the sphere and an oscillatory rotational component at a frequency $f_2$ about a second axis of the sphere that is orthogonal to said first axis, and where $f_1 \neq f_2$, $f_1 \neq 2f_2$, and $f_2 \neq 2f_1$.

8. A method of transmitting a clocked optically polarised signal wherein the signal is launched into a transmission path with its state of polarisation (SOP) modulated in a manner which, When represented on a Poincaré sphere, has an oscillatory rotational component at a frequency $f_1$ about a first axis of the sphere and an oscillatory rotational component at a frequency $f_2$ about a second axis of the sphere that is orthogonal to said first axis, and where $f_1 \neq f_2$, $f_1 \neq 2f_2$, and $f_2 \neq 2f_1$.

9. A method of receiving a clocked optical signal transmitted via a transmission path liable to exhibit polarisation mode dispersion (PMD), the signal having been launched into the transmission path with its state of polarisation (SOP) modulated in a manner which, when represented on a Poincaré sphere, has an oscillatory rotational component at a frequency $f_1$ about a first axis of the sphere and an oscillatory rotational component at a frequency $f_2$ about a second axis of the sphere that is orthogonal to said first axis, and where $f_1$, $f_2 \neq f_1 \neq 2f_2$, and $f_2 \neq 2f_1$, wherein the clocked optical signal is fed through an adjustable birefringence element before being detected by a photodetector and fed to a clock extraction circuit to provide a clock signal having frequency components at $f_1$ and $f_2$, which frequency components are employed as control signals in a feedback control loop regulating the birefringence of the birefringent element so as to minimise the amplitude of said frequency components.

10. An optical transmission system comprising a transmitter, a receiver, and a transmission path liable to exhibit polarisation mode dispersion (PMD) arranged to transmit a clocked optically polarised signal from the transmitter to the receiver via the transmission path wherein the signal is launched into the transmission path with its state of polarisation (SOP) modulated in a manner which, when represented on a Poincaré sphere, has an oscillatory rotational component at a frequency $f_1$ about a first axis of the sphere and an oscillatory rotational component at a frequency $f_2$ about a second axis of the sphere that is orthogonal to said first axis, and where $f_1 \neq f_2$, $f_1 \neq 2f_2$, and $f_2 \neq 2f_1$, wherein at the other end of said transmission path the clocked optical signal emergent therefrom is fed through an adjustable birefringence element before being detected by a photodetector and fed to a clock extraction circuit to provide a clock signal having frequency components at $f_1$ and $f_2$, which frequency components are employed as control signals in a feedback control loop regulating the birefringence of the birefringent element so as to minimise the amplitude of said frequency components.

11. A transmitter arranged to provide a clocked optically polarised signal wherein the signal is launched into a transmission path with its state of polarisation (SOP) modulated in a manner which, when represented on a Poincaré sphere, has an oscillatory rotational component at a frequency $f_1$ about a first axis of the sphere and an oscillatory rotational component at a frequency $f_2$ about a second axis of the sphere that is orthogonal to said first axis, and where $f_1 \neq f_2$, $f_1 \neq 2f_2$, and $f_2 \neq 2f_1$.

12. A receiver for receiving a clocked optical signal transmitted via a transmission path liable to exhibit polarisation mode dispersion (PMD), the signal having been launched into the transmission path with its state of polarisation (SOP) modulated in a manner which, when represented on a Poincaré sphere, has an oscillatory rotational component at a frequency $f_1$ about a first axis of the sphere and an oscillatory rotational component at a frequency $f_2$ about a second axis of the sphere that is orthogonal to said first axis, and where $f_1 \neq f_2$, $f_1 \neq 2f_2$, and $f_2 \neq 2f_1$, the receiver comprising an adjustable birefringence element, a photodetector, a control extraction circuit, and a feedback control loop, wherein the clocked optical signal emergent from the transmission path is fed through the adjustable birefringence element before being detected by the photodetector and fed to the clock extraction circuit to provide a clock signal having frequency components at $f_1$ and $f_2$, which frequency components are employed as control signals in a feedback control loop regulating the birefringence of the birefringent element so as to minimise the amplitude of said frequency components.

13. An optically polarised signal having a state of polarisation (SOP) modulated in a manner which, when represented on a Poincaré sphere, has an oscillatory rotational component at a frequency $f_1$ about a first axis of the sphere and an oscillatory rotational component at a frequency $f_2$ about a second axis of the sphere that is orthogonal to said first axis, and where $f_1 \neq f_2$, $f_1 \neq 2f_2$, and $f_2 \neq 2f_1$.

14. A method of performing polarisation mode dispersion (PMD) compensation on a received optically polarised signal, wherein at the receiver the signal is fed through the series combination of a polarisation state controller and variable birefringence birefringent element before being detected by a photodetector, which variable birefringence birefringent element comprises a length of polarisation maintaining fiber provided at an intermediate point in its length with a controllable variable strength polarisation mode coupler.

15. An optical receiver comprising a polarisation state controller, a variable birefringence/birefringent element, a photodetector, and arranged to be coupled to a transmission path wherein a signal emergent from the transmission path is fed through the series combination of the polarisation state controller and variable birefringence birefringent element before being detected by the photodetector, which variable birefringence birefringent element comprises a length of polarisation maintaining fiber provided at an intermediate point in its length with a controllable variable strength polarisation mode coupler.

16. A method of transmitting an optically polarised signal from a transmitter to a receiver via a transmission path liable to exhibit polarisation mode dispersion (PMD), wherein at the receiver the signal emergent from the transmission path is fed through the series combination of a polarisation state controller and variable birefringence birefringent element before being detected by a photodetector, which variable birefringence birefringent element comprises a length of polarisation maintaining fibre provided at an intermediate point in its length with a controllable variable strength polarisation mode coupler.

* * * * *